United States Patent
Negishi

(10) Patent No.: US 10,771,724 B2
(45) Date of Patent: Sep. 8, 2020

(54) IMAGE CAPTURING APPARATUS

(71) Applicant: CANON KABUSHIKI KAISHA, Tokyo (JP)

(72) Inventor: Norio Negishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/240,095

(22) Filed: Jan. 4, 2019

(65) Prior Publication Data
US 2019/0141272 A1    May 9, 2019

Related U.S. Application Data

(62) Division of application No. 15/454,862, filed on Mar. 9, 2017, now Pat. No. 10,212,378.

(30) Foreign Application Priority Data

Mar. 10, 2016   (JP) ................. 2016-047364

(51) Int. Cl.
*H04N 5/232* (2006.01)
*H04N 5/378* (2011.01)
(Continued)

(52) U.S. Cl.
CPC ............ *H04N 5/378* (2013.01); *H04N 5/357* (2013.01); *H04N 5/3696* (2013.01); *H04N 9/045* (2013.01); *H04N 5/374* (2013.01)

(58) Field of Classification Search
CPC .. H04N 5/23212; H04N 5/235; H04N 5/2353; G03B 3/00; G03B 13/20;
(Continued)

(56) References Cited

U.S. PATENT DOCUMENTS 8,988,595 B2    3/2015  Kunieda et al.
9,894,237 B2    2/2018  Negishi
(Continued)

FOREIGN PATENT DOCUMENTS

CN    101312496 A    11/2008
CN    101459776 A     6/2009
(Continued)

OTHER PUBLICATIONS

The above foreign patent documents were cited in a Sep. 4, 2019 Chinese Office Action, which is enclosed with an English Translation, that issued in Chinese Patent Application No. 201710149061.8.

(Continued)

*Primary Examiner* — Kelly L Jerabek
(74) *Attorney, Agent, or Firm* — Cowan, Liebowitz & Latman, P.C.

(57) ABSTRACT

An image capturing apparatus is provided with a pixel array that has a plurality of image forming pixels and a plurality of focus detection pixels, a readout unit that reads out a pixel signal from the pixel array, an A/D conversion unit that has a first mode for A/D converting the pixel signal read out by the readout unit with a first resolution and a second mode for A/D converting the pixel signal read out by the readout unit with a second resolution that is higher than the first resolution, and a control unit that switches between the first mode and the second mode in accordance with the pixel signal read out from the pixel array.

7 Claims, 15 Drawing Sheets

(51) Int. Cl.
*H04N 5/369* (2011.01)
*H04N 9/04* (2006.01)
*H04N 5/357* (2011.01)
*G03B 13/00* (2006.01)
*H04N 5/374* (2011.01)

(58) Field of Classification Search
CPC .......... G03B 13/36; G02B 7/28; G02B 7/285; G02B 7/32; G02B 7/34; G02B 7/36; G02B 7/38; G02B 7/365
See application file for complete search history.

(56) References Cited

U.S. PATENT DOCUMENTS

| | | | |
|---|---|---|---|
| 10,212,378 B2* | 2/2019 | Negishi | H04N 5/357 |
| 2007/0080844 A1 | 4/2007 | Terazawa et al. | |
| 2013/0051446 A1 | 2/2013 | Vijayasankar et al. | |
| 2014/0232913 A1 | 8/2014 | Sakane | |
| 2015/0281540 A1* | 10/2015 | Matsuoka | H04N 5/2355 348/362 |
| 2015/0296129 A1 | 10/2015 | Ishikawa | |
| 2015/0350526 A1 | 12/2015 | Toyoda | |
| 2016/0337578 A1 | 11/2016 | Kikuchi | |
| 2016/0349522 A1 | 12/2016 | Onuki et al. | |

FOREIGN PATENT DOCUMENTS

| | | |
|---|---|---|
| CN | 102547116 A | 7/2012 |
| CN | 103997612 A | 8/2014 |
| CN | 104519276 A | 4/2015 |
| CN | 105100650 A | 11/2015 |
| JP | 2012-080195 | 4/2012 |
| JP | 2013-211832 | 10/2013 |
| JP | 2013-236362 | 11/2013 |
| JP | 2014-160930 A | 9/2014 |

OTHER PUBLICATIONS

The above patent documents were cited in a Japanese Office Action dated Dec. 20, 2019, which is inclosed without translation, that issued in the corresponding Japanese Patent Application No. 2016-047364.

* cited by examiner

FIG. 5

| B | G | B | G | B | G | B | G | B | G |
|---|---|---|---|---|---|---|---|---|---|
| G | R | G | R | G | R | G | R | G | R |
| SA | G | B | G | SA | G | B | G | SA | G |
| G | R | G | R | G | R | G | R | G | R |
| B | G | B | G | B | G | B | G | B | G |
| G | SB | G | R | G | SB | G | R | G | SB |
| B | G | B | G | B | G | B | G | B | G |
| G | R | G | R | G | R | G | R | G | R |

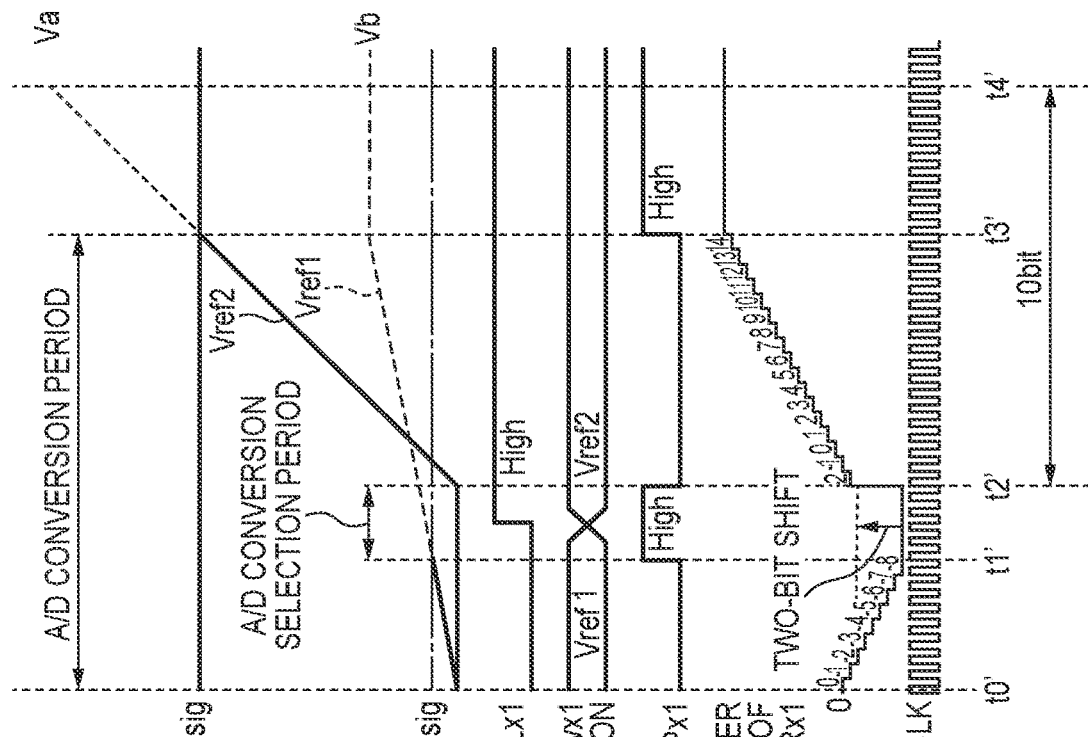
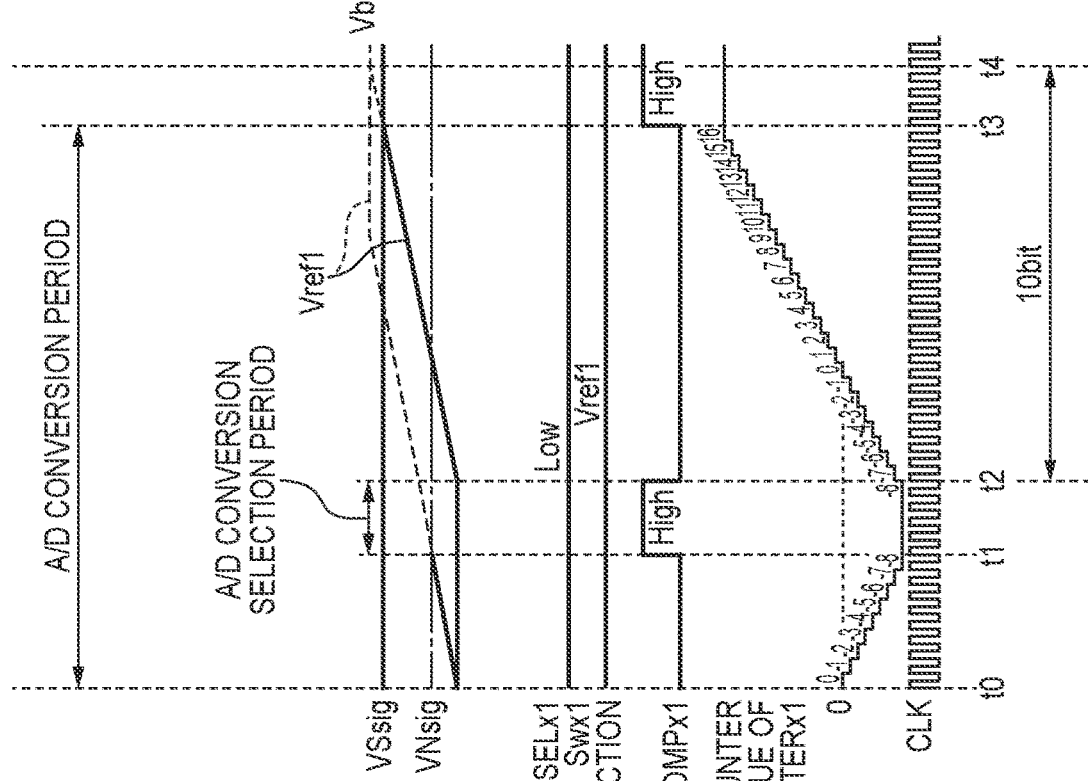

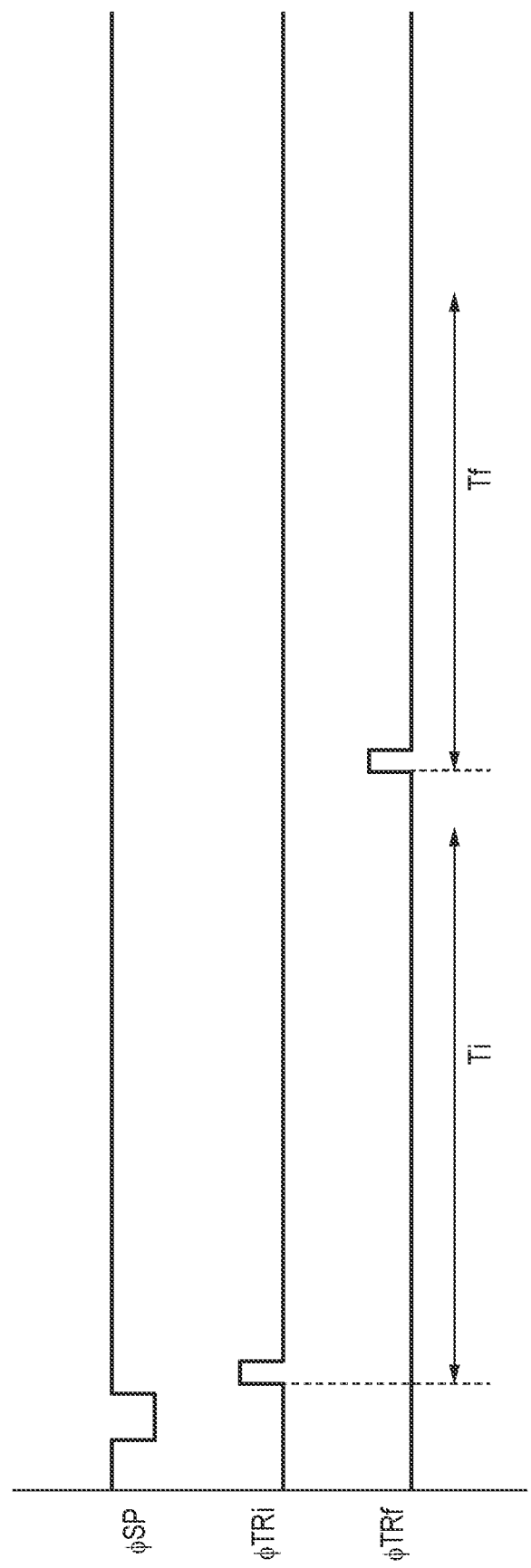

F I G. 13
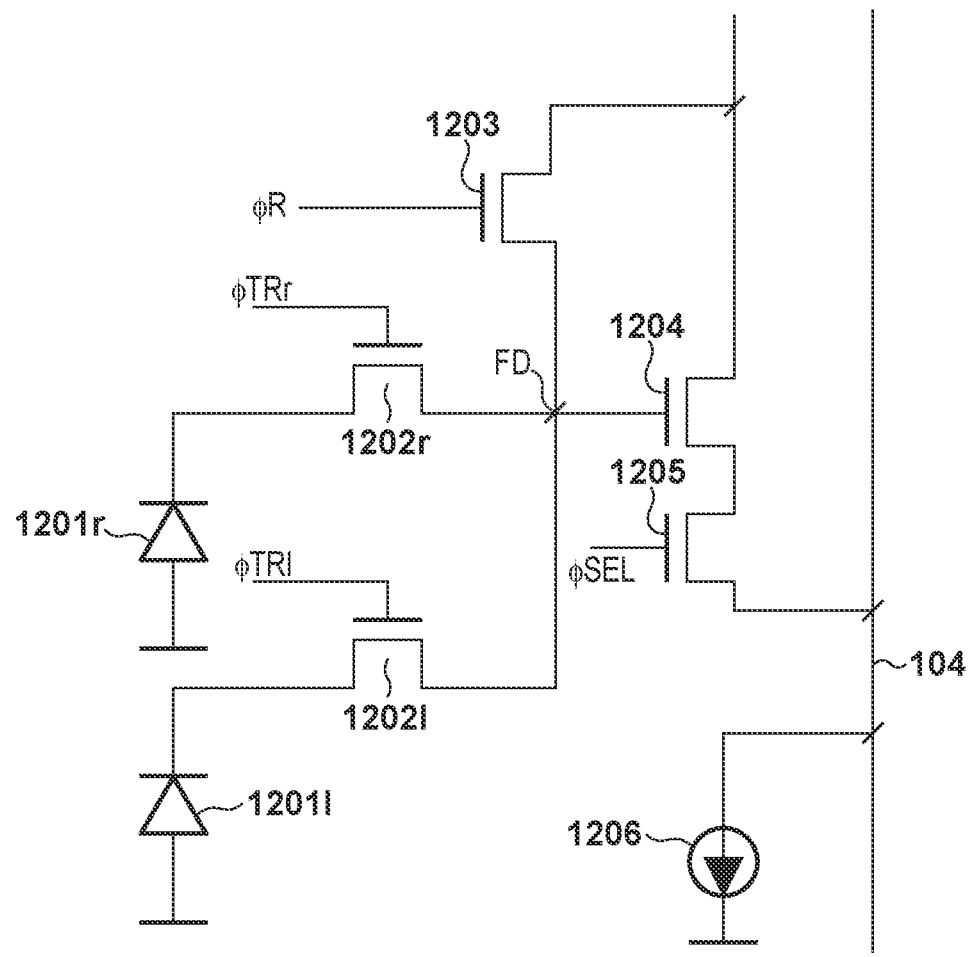

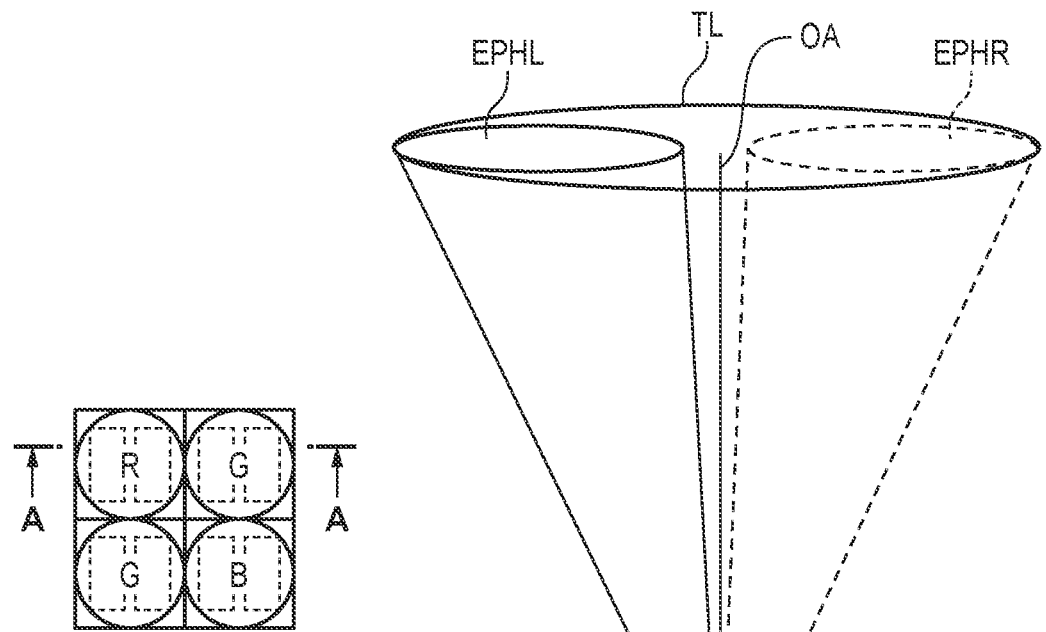
FIG. 14A
FIG. 14B
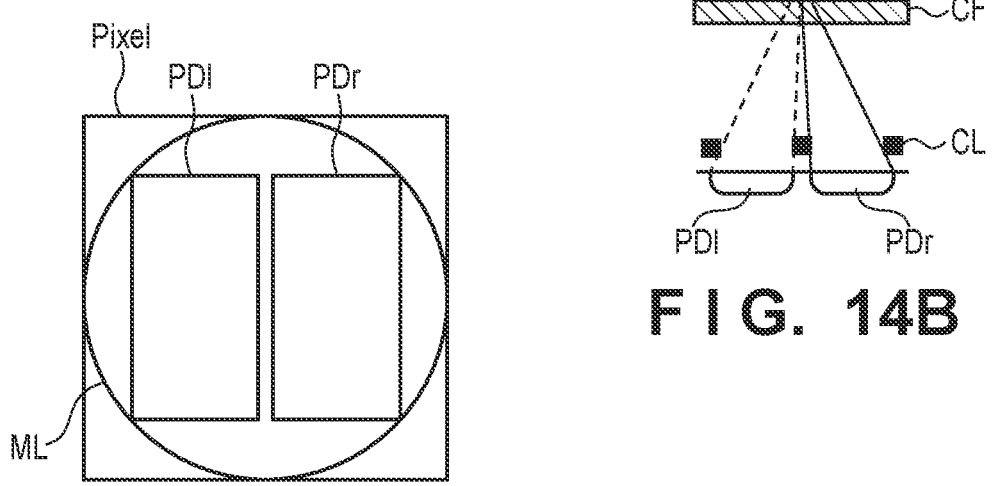
FIG. 14C

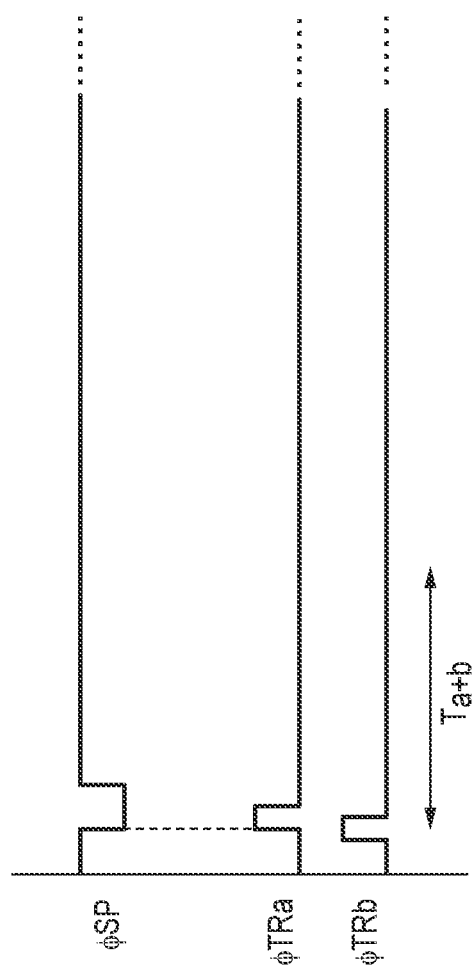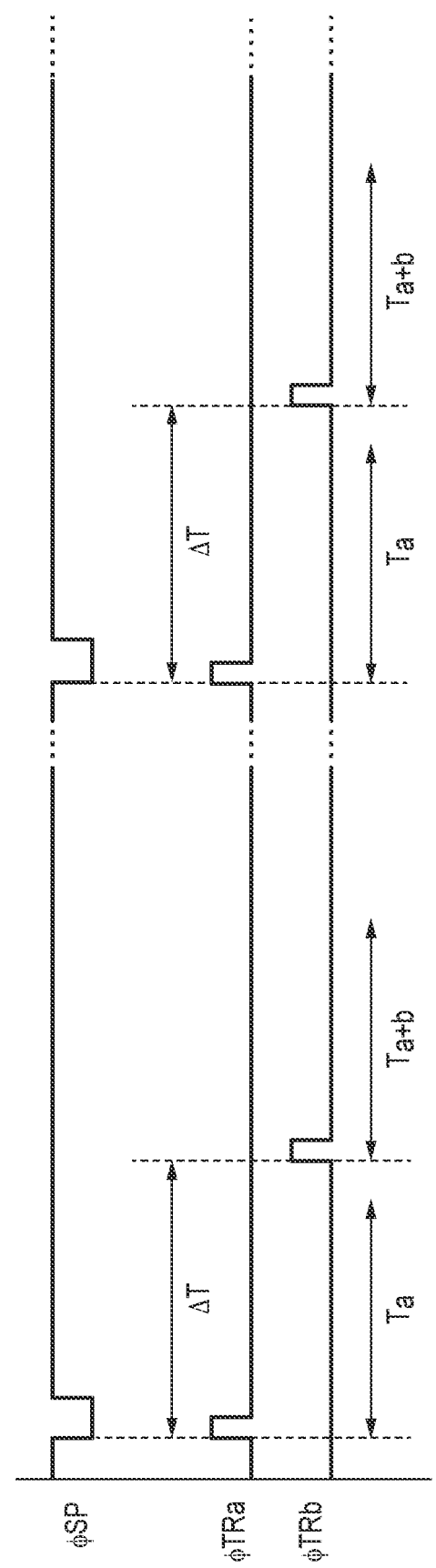
FIG. 15A
FIG. 15B

IMAGE CAPTURING APPARATUS

CROSS-REFERENCE TO RELATED APPLICATIONS

This application is a divisional of application Ser. No. 15/454,862, filed Mar. 9, 2017 the entire disclosure of which is hereby incorporated by reference.

BACKGROUND OF THE INVENTION

Field of the Invention

The present invention relates to an image capturing apparatus.

Description of the Related Art

In recent years, as an automatic focus detection technique, there is a technique called an on-imaging plane phase difference method. In this technique, photoelectric conversion is performed on a pair of subject images formed by light beams that have passed through two different areas (hereinafter, referred to as pupil areas) in an exit pupil of an imaging optical system, using a plurality of pixels for focus detection provided on an image sensor, in order to obtain a pair of picture signals from these pixels. A relative position shift amount (hereinafter, referred to as an image shift value) between these picture signals is then calculated by calculating the correlation of this pair of picture signals, and a focus shift amount (hereinafter, referred to as a defocus amount) indicating the focus state of the imaging optical system is calculated from this image shift value.

For example, in Japanese Patent Laid-Open No. 2013-236362, a configuration is adopted in which one microlens having a converging action and two photodiodes (hereinafter, referred to as PDs) are provided for one focus detection pixel, and these two PDs receive light beams from the two pupil areas. The above-described pair of picture signals can be obtained by providing a plurality of the above focus detection pixels in the image sensor.

In addition, in Japanese Patent Laid-Open No. 2012-80195, two focus detection pixel groups that are different in the direction in which an opening of a wiring layer provided in front of the PDs is shifted relative to the pixel center are provided in the image sensor. These two focus detection pixel groups receive light beams from the two pupil areas, and thereby a pair of picture signals can be obtained.

Incidentally, output signals from focus detection pixels used in an imaging plane phase difference detection method are used for focus detection, and thus high resolution is also demanded when A/D conversion is performed. However, there is a possibility that, if the resolution during A/D conversion is lowered in order to speed up A/D conversion, the resolution of the output signals of the focus detection pixels will be lowered, and as a result, the defocus amount detection accuracy will decrease.

SUMMARY OF THE INVENTION

The present invention has been made in light of the above-described problem, and makes it possible to read out pixel signals at a high speed while suppressing deterioration in the accuracy of focus detection, in an image capturing apparatus for performing automatic focus detection by an imaging plane phase difference detection method.

According to a first aspect of the present invention, there is provided an image capturing apparatus comprising: a pixel array that has a plurality of image forming pixels and a plurality of focus detection pixels; a readout unit that reads out a pixel signal from the pixel array; an A/D conversion unit that has a first mode for A/D converting the pixel signal read out by the readout unit with a first resolution and a second mode for A/D converting the pixel signal read out by the readout unit with a second resolution that is higher than the first resolution; and a control unit that switches between the first mode and the second mode in accordance with the pixel signal read out from the pixel array.

According to a second aspect of the present invention, there is provided an image capturing apparatus comprising: a pixel array that has a plurality of unit pixels that each include a plurality of photoelectric conversion elements that receive light beams that have passed through different areas of an exit pupil of an imaging optical system; a readout unit that reads out a pixel signal from the pixel array; an A/D conversion unit that has a first mode for A/D converting the pixel signal read out by the readout unit with a first resolution and a second mode for A/D converting the pixel signal read out by the readout unit with a second resolution that is higher than the first resolution; and a control unit that switches between the first mode and the second mode in accordance with the pixel signal read out from the pixel array.

Further features of the present invention will become apparent from the following description of exemplary embodiments with reference to the attached drawings.

BRIEF DESCRIPTION OF THE DRAWINGS

FIG. 5 is a diagram showing the pixel arrangement of image forming pixels and focus detection pixels of the image sensor.

FIGS. 7A and 7B are timing diagrams of A/D conversion in the first embodiment.

FIG. 8 is a diagram illustrating the output timing of pixels in the first embodiment.

FIG. 13 is a diagram of the electrical configuration of a pixel in a second embodiment.

FIGS. 14A, 14B and 14C are respectively a plan view and a cross-sectional view of image forming pixels of an image sensor in the second embodiment, and an enlarged view of FIG. 14A.

FIGS. 15A and 15B are diagrams illustrating the output timing of pixels in the second embodiment.

DESCRIPTION OF THE EMBODIMENTS

Embodiments of the present invention will be described below in detail with reference to the attached drawings.

First Embodiment

Figure 1:
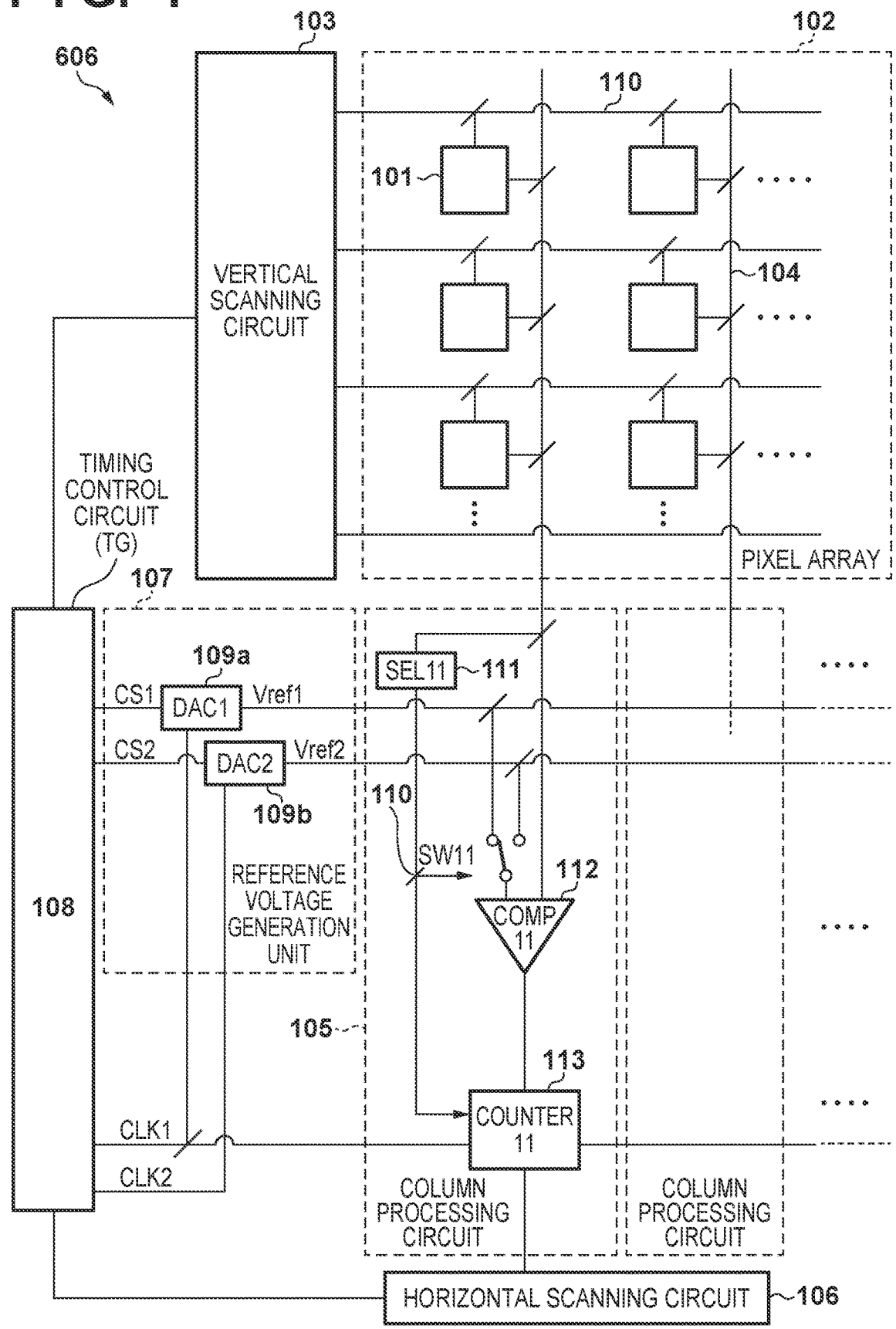
FIG. 1 is a diagram showing the configuration of an image sensor in a first embodiment of the present invention.

A first embodiment of the present invention will be described taking an image capturing apparatus that uses an image sensor in which a plurality of focus detection pixels are discretely arranged on an imaging plane as an example. FIG. 1 is a block diagram showing the configuration of the image sensor in the first embodiment of the present invention. In FIG. 1, an image sensor 606 has pixels 101, a pixel array 102, a vertical scanning circuit 103, column signal lines 104, column processing circuits 105, a horizontal scanning circuit 106, a reference voltage generation unit 107, a timing control circuit 108 (hereinafter, referred to as TG) and control lines 110. The image sensor 606 further has digital-to-analog conversion circuits DAC1 (109a) and DAC2 (109b), a switch SW11 (110), a selector SEL11 (111), a comparator COMP11 (112) and a counter 11 (113).

The pixel array 102 is constituted by a large number of pixels 101 that are arranged two-dimensionally. The pixel 101 includes a photoelectric conversion portion such as a photodiode, a transfer transistor, a reset transistor, an amplifier transistor and a pixel selection transistor. Detailed description will be given later with reference to FIG. 2. Signal readout from pixels and pixel reset are performed in units of rows, and thus pixels in one row are each connected in common to a control line 110 extending from the vertical scanning circuit 103. Also, pixels in the same column are connected to a common column signal line 104 for reading out pixel signals Vsig.

The vertical scanning circuit 103 sequentially selects pixel rows in order to control readout rows and reset rows. A scanning timing is controlled by TG108. Usually, first, reset scanning is performed from the first pixel row in order, and after that, electric charges are accumulated for a predetermined time period, and readout scanning is again performed from the first pixel row in order. The above-described predetermined time period that is the time period during which electric charges are accumulated is controlled by receiving a signal from TG108, for example, and is changed in accordance with imaging conditions such as the light amount of the subject. Also, this time period during which electric charges are accumulated is referred to as an exposure time period, and indicates a time period from a reset completion timing until readout start.

The column processing circuit 105 is constituted to include SW11 (110), SEL11 (111), COMP11 (112) and the counter 11. The column processing circuit 105 is provided for each column of the pixel array 102, and operates as an A/D conversion circuit for converting, into a digital signal, a pixel signal Vsig that is on the column signal line 104 and has been read out. Note that in this embodiment, a column processing circuit of the first column will be described, but the column processing circuits of the other columns perform similar operations.

SEL11 (111) performs signal comparison in a wide range, and selects whether to perform A/D conversion with a first resolution (a first mode), or to perform signal comparison in a narrow range and perform A/D conversion with a second resolution that is higher than the first resolution (a second mode). This circuit compares the signal level of a pixel signal Vsig to a reference voltage VREF. If the signal level of the pixel signal Vsig is higher than or equal to the reference voltage VREF, this circuit outputs High, and otherwise outputs Low. A comparison circuit (not illustrated) is used for the comparison with the reference voltage VREF, but the comparison circuit used here does not need to have an accuracy as high as that of COMP11 (112) above. In the case where the signal level of the pixel signal Vsig is at least higher than or equal to the signal level of the reference voltage VREF, it suffices that signal comparison is performed in a wide range and selection is switched so that A/D conversion with a low data resolution is performed. Note that the reference voltage VREF can take three different types of voltage values.

SW11 (110) selects Vref2 as a reference voltage used for comparison performed by COMP11 (112) in the case where SEL11 (111) is High, and selects Vref1 in the case where SEL11 (111) is Low. The reference voltage Vref1 having a ramp waveform realizes A/D conversion with a high data resolution for performing signal comparison in a narrow range. A change amount per unit time of the reference voltage Vref2 having a ramp waveform is four times that of the reference voltage Vref1, and the reference voltage Vref2 having a ramp waveform realizes A/D conversion with a low data resolution for performing signal comparison in a wide range.

The counter 11 compares a pixel signal Vsig to the reference voltage Vref1 or Vref2 that has a ramp waveform and has been selected by SW11 (110), and counts from comparison start until an output value having a ramp waveform matches the pixel signal Vsig or is inverted. The count value obtained at this time is output as a digital signal. The digital signal that has been output has a different data resolution depending on the selected ramp waveform, and is therefore input to an imaging signal processing circuit at a later stage to undergo correction processing such as bit shift processing in the imaging signal processing circuit. The reference voltages Vref1 and Vref2 are generated as ramp waveforms in DAC1 (109a) and DAC2 (109b) based on digital signals CS1 and CS2 output from TG108, respectively.

Figure 2:
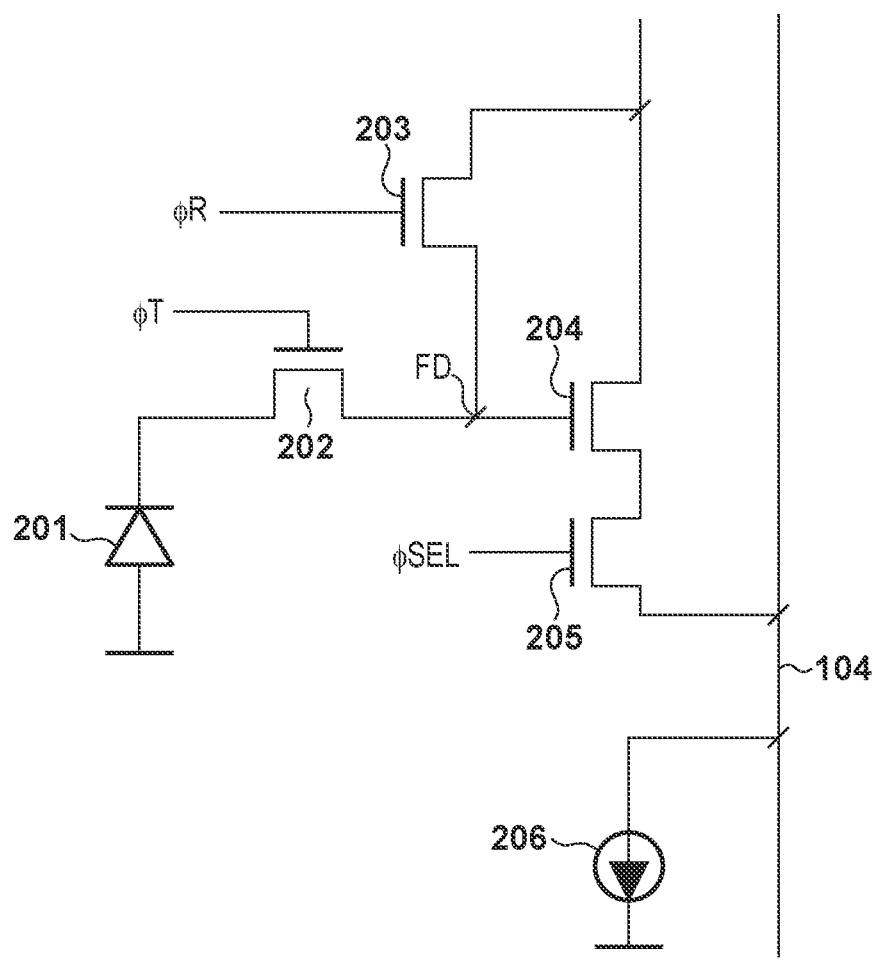
FIG. 2 is a diagram showing the electrical configuration of a pixel of the image sensor.

FIG. 2 is a circuit diagram showing the configuration of the pixel 101. The same reference signs are given to the constituent elements that are same as those in FIG. 1. The pixel 101 is constituted to include a photodiode 201, a transfer transistor 202, a reset transistor 203, an amplifier transistor 204, a selection transistor 205 and a current source 206. The photodiode 201 generates electric charges by photoelectric conversion. There are two types of pixels, namely, an image forming pixel and a focus detection pixel in the pixel 101. The image forming pixel is a pixel for obtaining an image signal, and the focus detection pixel forms a pair of picture signal obtaining pixels used for calculating a defocus amount required when performing automatic focus detection. The structure of the photodiode 201 is different between the image forming pixel and the focus detection pixel. Detailed description will be given later.

The transfer transistor 202 transfers electric charges accumulated in the photodiode 201 to a floating diffusion unit FD, in accordance with a control pulse φT. The amplifier transistor 204 amplifies the electric charges on the floating diffusion unit FD by performing source follower readout. The reset transistor 203 resets the electric charges on the floating diffusion unit FD to a power supply potential in accordance with a control pulse φR. The selection transistor 205 outputs an output signal of the amplifier transistor 204 to the column signal line 104 in accordance with a control pulse φSEL. The current source 206 is connected the column signal line 104. The pixel 101 may have not only the configuration in FIG. 2 but also a configuration in which pixel selection control is performed based on a potential that is set in the floating diffusion unit FD, without the selection transistor 205, a configuration in which a plurality of photodiodes 201 share the common amplifier transistor 204, and the like.

Figures 3A, 3B:
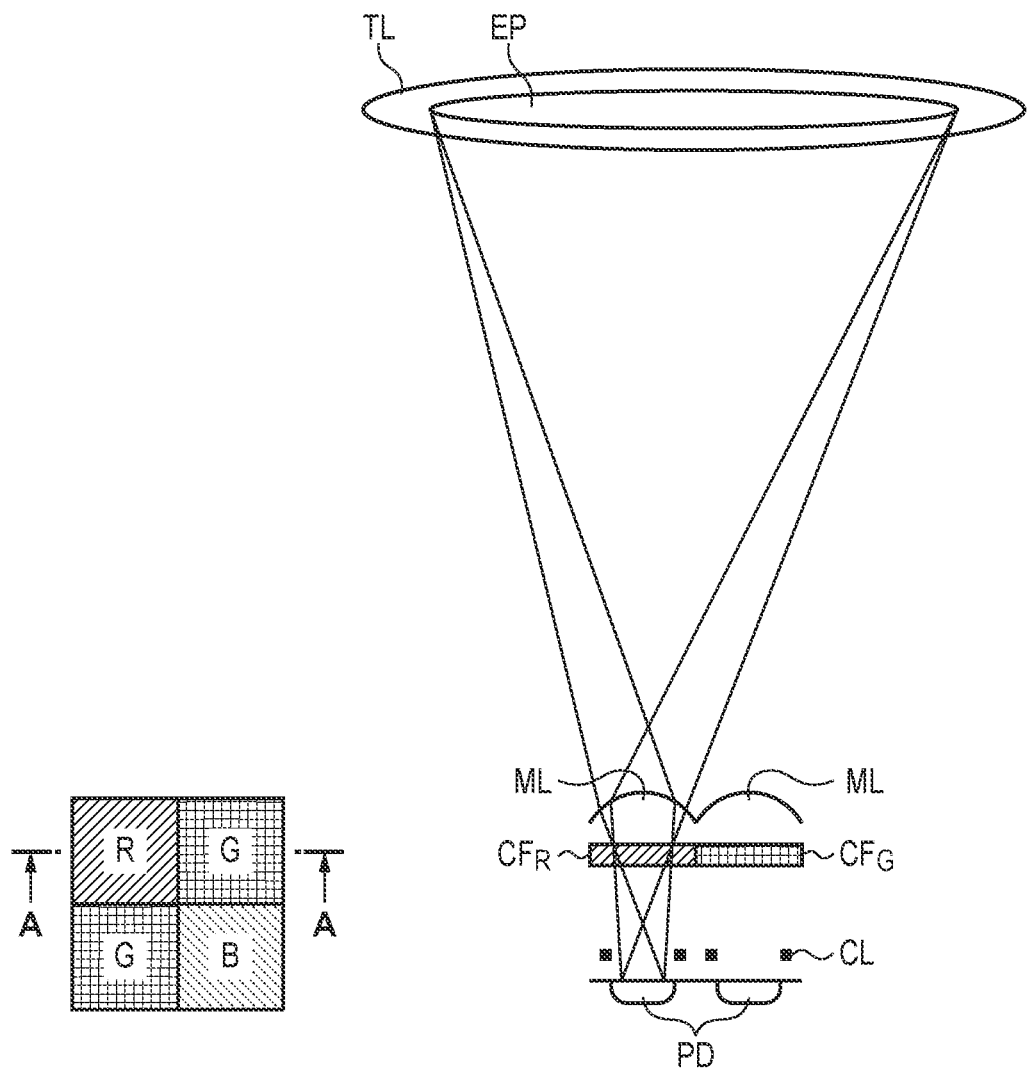
FIGS. 3A and 3B are respectively a plan view and a cross-sectional view of image forming pixels of the image sensor.
Figures 4A, 4B:
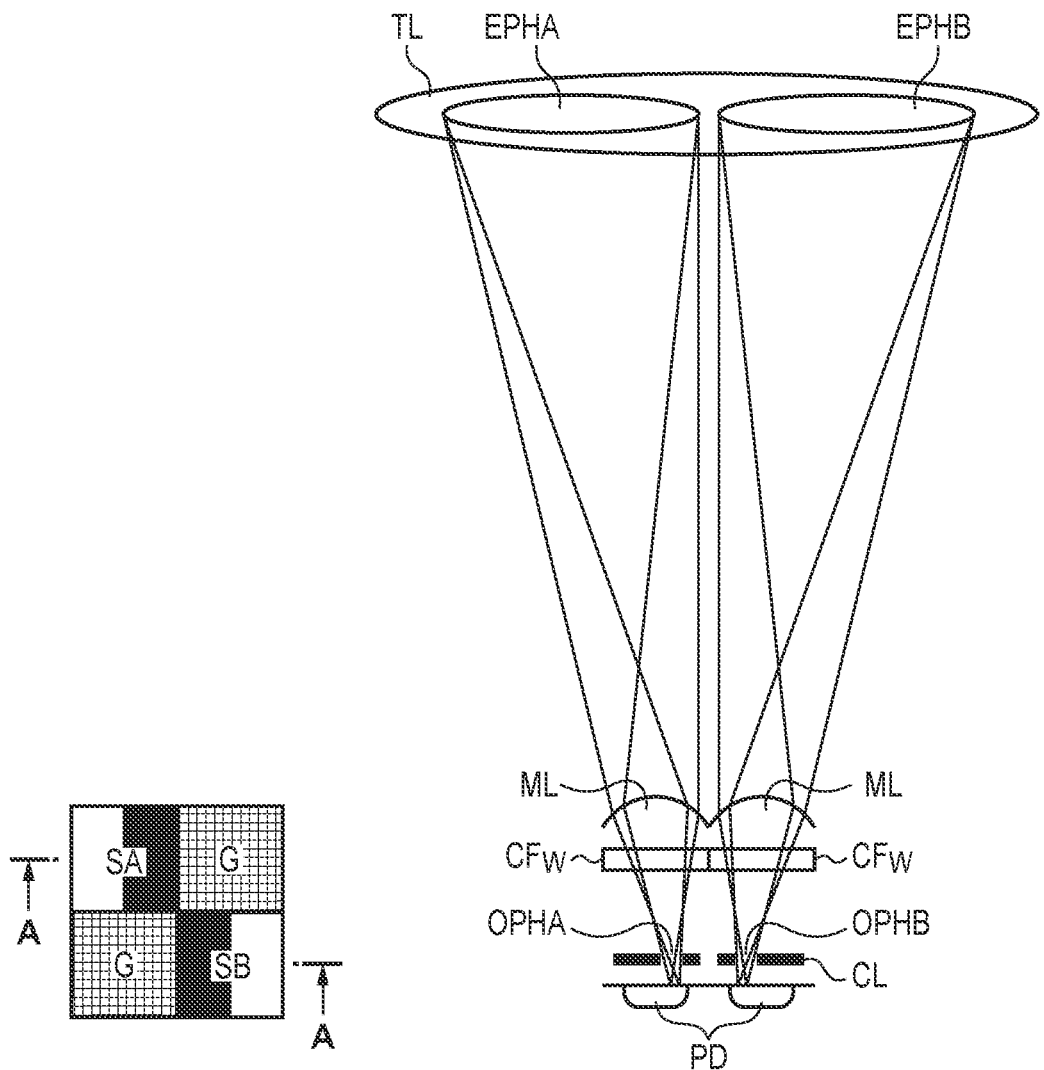
FIGS. 4A and 4B are a cross-sectional view and a plan view of focus detection pixels of the image sensor.

FIGS. 3A and 3B and FIGS. 4A and 4B are diagrams respectively illustrating the cross-sectional structures of image forming pixels and focus detection pixels. In this embodiment, a Bayer array is adopted according to which pixels (G pixels) having spectral sensitivity for G (green) are arranged as two diagonal pixels in 4 pixels consisting of 2 rows×2 columns, and pixels (a R pixel and a B pixel) respectively having spectral sensitivity for R (red) and B (blue) are arranged as each of the two remaining pixels. Additionally, in this Bayer array, focus detection pixels having a structure shown in FIGS. 4A and 4B are discretely arranged according to a predetermined rule.

FIGS. 3A and 3B are diagrams showing the arrangement and configuration of image forming pixels. FIG. 3A is a plan view of image forming pixels in 2 rows×2 columns. As is well known, in a Bayer array, G pixels are arranged in the diagonal direction, and an R pixel and a B pixel are arranged as the two remaining pixels. This structure of 2 rows×2 columns is repeatedly arranged. FIG. 3B shows a cross section at A-A in FIG. 3A.

An image forming pixel has an on-chip microlens ML arranged in the frontmost of the pixel, and one of an R (red) color filter CFR, a G (green) color filter CFG and a B (blue) color filter CFB. The image forming pixel further has a PD (the photodiode 201) and a wiring layer CL for forming a signal line for transmitting various signals in the CMOS sensor. The image forming pixel receives light that has passed through an exit pupil EP of an imaging optical system TL.

The on-chip microlens ML and the photodiode PD of the image forming pixel are configured to take in a light beam that has passed through the imaging optical system TL as effectively as possible. Specifically, the exit pupil EP and the photodiode PD of the imaging optical system TL has a conjugate relationship due to the microlens ML, and the effective area of the photodiode PD is designed to be as large as possible. In FIG. 3B, only a light beam that enters the R pixel is illustrated, but the G pixel and the B pixel have the same structure. The imaging optical system TL is designed such that the exit pupil EP corresponding to each pixel has a large diameter, and a light beam from the subject is effectively taken in in order to improve the S/N characteristics of an image signal as much as possible.

FIGS. 4A and 4B are diagrams showing the arrangement and structure of focus detection pixels for performing pupil division in the horizontal direction (sideways) of a photographing lens. FIG. 4A is a plan view of pixels in 2 rows×2 columns including focus detection pixels. In the case of obtaining imaging signals, G pixels constitute a main component of luminance information. Also, since the image recognition characteristics of humans are sensitive to luminance information, image quality deterioration is easily recognized if G pixels are damaged. On the other hand, R pixels or B pixels are pixels for obtaining color information, but humans are insensitive to color information, and thus if slight damage is caused in the pixels for obtaining color information, image quality deterioration is not easily notified. Therefore, in this embodiment, out of the pixels in 2 rows×2 columns, the G pixels remain as image forming pixels, and a portion of the R pixel and a portion of the B pixel serve as focus detection pixels. In FIG. 4A, these are denoted by SA and SB (respectively, an SA pixel and an SB pixel). In FIGS. 4A and 4B, the SA pixel and the SB pixel are adjacent in an oblique direction, but this arrangement does not necessarily need to be adopted.

FIG. 4B shows the cross section A-A when the SA pixel and the SB pixel in FIG. 4A are arranged side by side. The focus detection pixel has the on-chip microlens ML arranged frontmost of the pixel and a W (white) color filter CFW. Furthermore, the focus detection pixel has a PD (the photodiode 201) and a wiring layer CL for forming a signal line for transmitting various signals in the CMOS sensor. The SA pixel has an opening portion OPHA, the SB pixel has an opening portion OPHB, and the opening portion OPHA and the opening portion OPHB respectively receive light that has passed through an exit pupil EPHA on the left side of a photographing lens TL and an exit pupil EPHB on the right side of the photographing lens TL.

The structure of the microlens ML and the photodiode PD is the same as that of the image forming pixel shown in FIG. 3B. In this embodiment, a signal of the focus detection pixel is not used for generating an output image, and therefore a transparent film (White) is arranged on the color filter CFW, instead of a color filter for color separation. Also, due to pupil division being performed in the image sensor, the opening of the wiring layer CL is arranged so as to be shifted in one direction relative to the centerline of the microlens ML. Specifically, the SA pixel and the opening portion OPHA thereof are arranged so as to be shifted on the right side, and thus a light beam that has passed through the exit pupil EPHA on the left side of the photographing lens TL is received. Similarly, the opening portion OPHB of the SB pixel is arranged so as to be shifted on the left side, and therefore a light beam that has passed through the exit pupil EPHB on the right side of the photographing lens TL is received. Therefore, the SA pixels are regularly arranged in the horizontal direction, and a subject image obtained with a pixel group of these pixels is assumed to be an A image. The SB pixels are also regularly arranged in the horizontal direction, and a subject image obtained with a pixel group of these pixels is assumed to be a B image. Accordingly, an image shift value can be calculated from the A image and the B image, and a defocus amount of the subject image can be calculated from this image shift value. Moreover, in the case where it is desired to detect a defocus amount in the vertical direction (column direction), it suffices to adopt a configuration in which the SA pixels and the opening portions OPHA thereof are arranged so as to be shifted upward, and the SB pixels and the opening portions OPHB thereof are arranged so as to be shifted downward.

FIG. 5 is a pixel arrangement diagram showing the arrangement of a plurality of image forming pixels and a plurality of focus detection pixels in this embodiment. In FIG. 5, reference signs R, G and B are assigned to R pixels, G pixels and B pixels described with reference to FIGS. 3A and 3B. Also, reference signs SA and SB are assigned to SA pixels and SB pixels described with reference to FIGS. 4A and 4B. Regarding the pixel arrangement of the focus detection pixels, an SA pixel and an SB pixel form a pixel pair, and pixel pairs are arranged at equal intervals. In addition, considering that a focus detection pixel group cannot be used for capturing an image, the pixel pairs are discretely arranged at an interval to a certain degree in the X and Y directions, in this embodiment.

Figure 6:
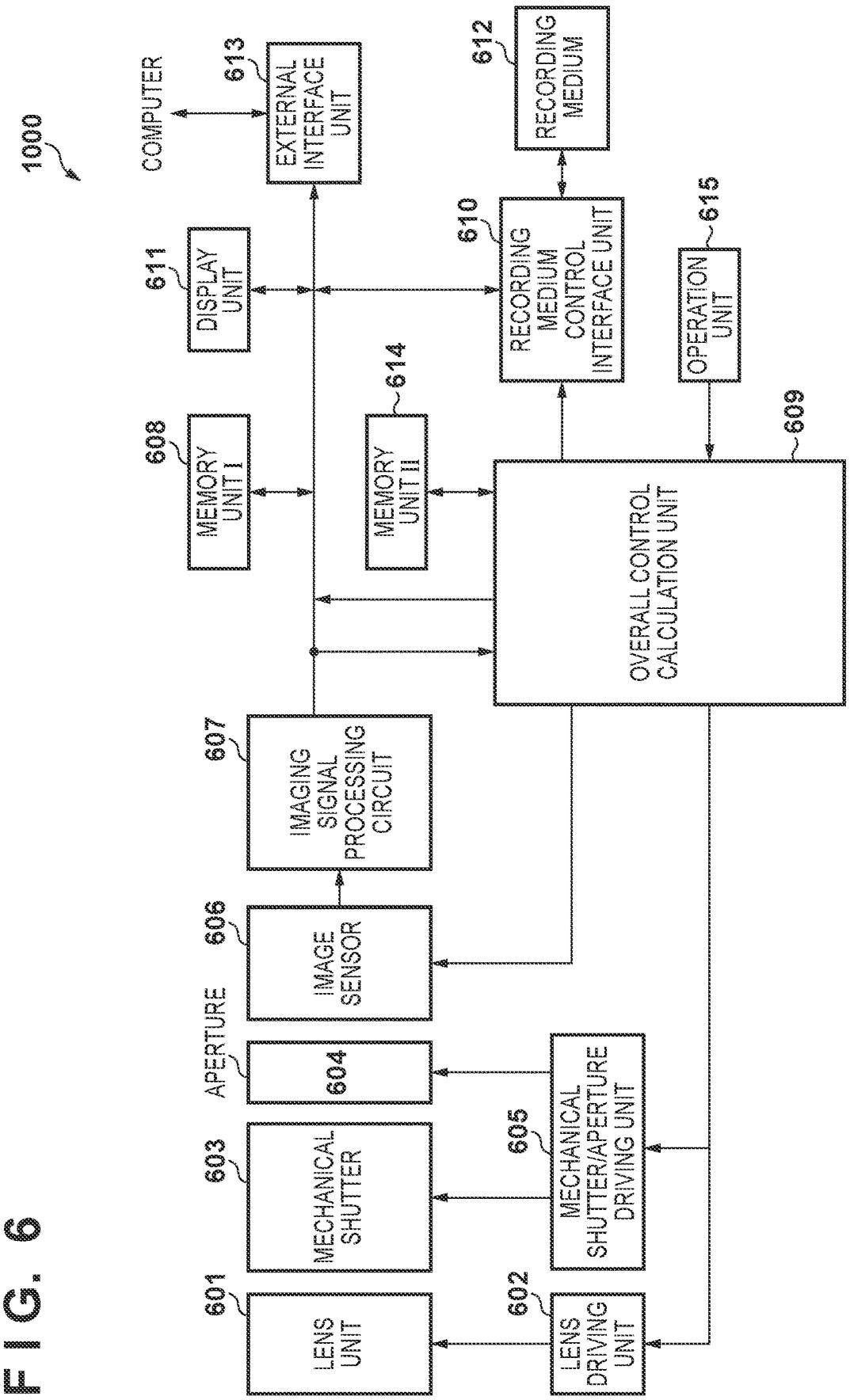
FIG. 6 is a block diagram of an image capturing apparatus in the first embodiment.

FIG. 6 is a diagram showing the block configuration of an image capturing apparatus that uses the image sensor shown in FIG. 1. In FIG. 6, an image capturing apparatus 1000 has a lens unit 601, a lens driving unit 602, a mechanical shutter 603, an aperture 604, a mechanical shutter/aperture driving unit 605, the image sensor 606, an imaging signal processing circuit 607 and an overall control calculation unit 609. A recording medium control interface unit 610, a recording medium 612, an operation unit 615 and a memory unit II 614 are connected to the overall control calculation unit 609. Also, a memory unit I 608, a display unit 611 and an external interface unit 613 are connected to the overall control calculation unit 609 via a bus.

In FIG. 6, the image sensor 606 is the image sensor described with reference to FIGS. 1 to 5. Subject light that has passed through the lens unit 601 is adjusted to an appropriate light amount by the aperture 604, and forms a subject image on the image sensor 606. The subject image (image signals) captured with the image forming pixels of the image sensor 606 is subjected to correlated double sampling, gain adjustment and A/D conversion from analog signals into digital signals, in peripheral circuits of the image sensor 606. The subject image as R, Gr, Gb and B signals is then sent to the imaging signal processing circuit 607. The imaging signal processing circuit 607 performs various types of image signal processing such as low-pass filter processing, shading processing for reducing noise, and WB processing, in addition, various types of correction such as defect correction, dark shading correction and black image subtraction processing, compression, and the like, and generates image signals.

The subject image obtained with the focus detection pixels of the image sensor 606 is subjected to correlated double sampling, gain adjustment and A/D conversion from analog signals into digital signals, in the peripheral circuitries of the image sensor 606, and is sent to the imaging signal processing circuit 607. In the imaging signal processing circuit 607, an image shift value is calculated from an A image that is a subject image additionally obtained from the pixel group of the SA pixels and a B image that is a subject image obtained from the pixel group of the SB pixels. Furthermore, a defocus amount is calculated from an image shift value X, and is stored in the memory unit II 614. Based on this defocus amount, the overall control calculation unit 609 instructs the lens driving unit 602 to move the lens unit 601, and thereby automatic focus adjustment is performed.

The mechanical shutter 603 mechanically controls the irradiation time of light that enters the aperture 604 and the image sensor 606 at later-stages. Driving of these mechanical shutter 603 and aperture 604 is controlled by the shutter/aperture driving unit 605. The overall control calculation unit 609 performs overall control of the image capturing apparatus and various types of calculation. The memory unit I 608 temporarily stores image data. The recording medium control interface unit 610 records image data in the recording medium 612 or reads out image data from the recording medium 612. The display unit 611 displays image data. The recording medium 612 is a removable storage medium such as a semiconductor memory, and records image data or is used for reading out image data. The external interface unit 613 is an interface for performing communication with an external computer and the like. The memory unit II 614 stores a calculation result of the overall control calculation unit 609. Information regarding a driving condition of the image capturing apparatus set by the user using the operation unit 615 is sent to the overall control calculation unit 609, and overall control of the image capturing apparatus is performed based on such information.

FIGS. 7A and 7B are diagrams illustrating an operation of A/D conversion of the solid-state image sensor shown in FIG. 1. The A/D conversion operation is different between the case of A/D converting a noise signal VNsig for not reading out electric charges generated in the photodiode 201 in the pixel 101 and the case of A/D converting a pixel signal VSsig for reading out electric charges generated in the photodiode 201 in the pixel 101. The A/D conversion operation is also different between the case where the pixel signal VSsig is relatively large and the case where the pixel signal VSsig is relatively small.

The Case where Pixel Signal VSsig is Relatively Small

FIG. 7A is a diagram illustrating an A/D conversion operation in the case where the voltage level of a pixel signal VSsig is lower than a reference voltage VREF (threshold), if the reference voltage VREF equals Vb. An operation of reading out a noise signal VNsig and the pixel signal VSsig in the stated order, and performing A/D conversion will be described.

Output of SEL11 (111) is set to Low until a time t0 immediately before the noise signal VNsig is read out and A/D conversion is started. SW11 (110) selects Vref1 as the reference voltage used for comparison performed by COMP11 (112), in accordance with the output of SEL11 (111) being Low. From the time t0 to a time t1, the reference voltage Vref1 changes in a ramp waveform, and the counter 11 (113) performs down counting by one for each clock with 10 bit accuracy, thereby carrying out an A/D conversion operation.

At the time t1, an output signal of COMP11 (112) changes from Low to High in accordance with the value of Vref1 having become larger than the noise signal VNsig. The counter 11 (113) stops down counting in accordance with the output signal of COMP11 (112) having changed to High. The count value of the counter 11 (113) at this time is a value obtained by converting the noise signal VNsig into a digital value.

After that, the pixel signal VSsig is read out. SEL11 (111) compares the output level of the pixel signal VSsig that has been read out to the reference voltage VREF (=Vb). If the output level of the pixel signal VSsig is larger than or equal to the reference voltage VREF (=Vb), SEL11 (111) outputs High, and otherwise outputs Low. In the case of FIG. 7A, the pixel signal VSsig is smaller than Vb, and thus the output signal of SEL11 (111) will be Low. SW11 (110) selects Vref1 as the reference voltage to be used for comparison performed by COMP11 (112), in accordance with the output signal of SEL11 being Low.

At a time t2, COMP11 (112) is set to Low when reference voltage selection is complete, and the reference voltage Vref1 is changed to a ramp waveform from the time t2 to a time t3. The counter 11 (113) performs up counting by one for each clock with 10 bit accuracy, thereby carrying out an A/D conversion operation. At the time t3, the output signal of COMP11 (112) changes from Low to High, in accordance with the value of the reference voltage Vref1 having become larger than the pixel signal VSsig. The counter 11 (113) stops up counting in accordance with the output signal of COMP11 (112) having changed to High. After that, the pixel signal VSsig that has been converted into a digital signal as the count value of the counter 11 (113) is input to the downstream imaging signal processing circuit 607, and is subjected to various types of image signal processing.

In this first embodiment, an A/D conversion selection time period is provided before starting to change the reference voltage Vref1 to a ramp waveform, and during this time period, SEL11 (111) selects a reference voltage for A/D conversion.

In FIG. 7A, the pixel signal VSsig is smaller than the reference voltage VREF (=Vb) of SEL11 (111), and thus the output of SEL11 (111) is Low. Vref1 is selected as a reference voltage in accordance with the output of SEL11 (111). The counter 11 (113) performs a counting-up operation by one count for each clock, and stops the counting operation when the output signal of COMP11 (112) is switched to High. The count value of the counter 11 (113) is set so as to be output without being bit shifted. As described above, in the case where the output level of the pixel signal VSsig is lower than the reference voltage VREF (=Vb), an operation of comparing with a reference voltage in a narrow range is performed, and thereby high resolution A/D conversion can be performed. Moreover, in this embodiment, both the pixel signal VSsig and the noise signal VNsig are subjected to A/D conversion with the same resolution. Therefore, S-N processing for subtracting the level of the noise signal VNsig from the output level of the pixel signal VSsig can be realized simply by changing the counting direction of the pixel signal VSsig and the noise signal VNsig.

The Case where Pixel Signal Vssig is Relatively Large

On the other hand, FIG. 7B is a diagram illustrating an A/D conversion operation in the case where the voltage level of a pixel signal VSsig is larger than or equal to a reference voltage VREF (=Vb). Similarly to FIG. 7A, an operation of reading out a noise signal VNsig and the pixel signal VSsig in the stated order and performing A/D conversion will be described.

Similarly to FIG. 7A, output of SEL11 (111) is set to Low by a time t0', and SW11 (110) selects Vref1 as the reference voltage used for comparison performed by COMP11 (112). The reference voltage Vref1 is changed to a ramp waveform from the time t0' to a time t1', and the counter 11 (113) performs down counting by one for each clock with 10 bit accuracy, thereby carrying out an A/D conversion operation of the noise signal VNsig.

At the time t1', an output signal of COMP11 (112) changes from Low to High in accordance with the value of the reference voltage Vref1 having become larger than the noise signal VNsig. The counter 11 (113) stops down counting in accordance with the output signal of COMP11 (112) having changed to High. The count value of the counter 11 (113) at this time is a value obtained by converting the noise signal VNsig into a digital value.

After that, the pixel signal VSsig is read out. SEL11 (111) compares the output level of the pixel signal VSsig that has been read out to the reference voltage VREF (=Vb). In the case of FIG. 7B, the pixel signal VSsig is larger than or equal to Vb, and thus the output of SEL11 (111) will be High. SW11 (110) selects Vref2 as the reference voltage used for comparison performed by COMP11 (112), in accordance with the output of SEL11 (111) being High. Moreover, due to the four-time difference in inclination between the reference voltage Vref1 and the reference voltage Vref2 caused in accordance with the output of SEL11 (111) has changed to High, the value counted by the counter 11 (113) is shifted by two bits on the lower-order bit side.

At a time t2', COMP11 (112) is set to Low when reference voltage selection is complete, and the reference voltage Vref2 is changed to a ramp waveform from the time t2' to a time t3'. The counter 11 (113) performs up counting by one for each clock with 10 bit accuracy, thereby carrying out A/D conversion of the pixel signal VSsig.

At the time t3', the output of COMP11 (112) changes from Low to High in accordance with the value of the reference voltage Vref2 having become larger than the pixel signal VSsig. The counter 11 (113) stops up counting in accordance with the output of COMP11 (112) having changed to High. After the counter 11 (113) is stopped, the pixel signal VSsig that has been converted into a digital signal as the count value of the counter 11 (113) is input to the downstream imaging signal processing circuit 607. Due to the four-fold difference in inclination between the reference voltage Vref1 and the reference voltage Vref2, a bit shift is performed by two bits on the higher-order bit side. After that, the imaging signal processing circuit 607 performs various types of image signal processing. Note that regarding a time period from the time t2 to t4 in FIG. 7A and a time period from the time t2' to t4' in FIG. 7B, the same time is required.

In FIG. 7B, the pixel signal VSsig is larger than or equal to the reference voltage VREF (=Vb) of SEL11 (111), and thus the output of SEL11 (111) is switched to High. As a result, Vref2 is selected as a reference voltage. The counter 11 (113) performs an operation of up counting by one for each clock, and stops up counting when COMP11 (112) changes to High. After that, the pixel signal VSsig that has been digitized is input to the imaging signal processing circuit 607, and is shifted for two bits on the higher-order bit side, thereby taking a value that is four times the count value. In this case, A/D conversion in a wide range is performed with a low resolution but at a high speed.

As described with reference to FIGS. 7A and 7B, the A/D conversion shown in FIG. 7A and the A/D conversion shown in FIG. 7B are switched in accordance with whether or not the output level of the output signal VSsig of each pixel in the image is larger than the reference signal Vb (reference level). Digital data that underwent A/D conversion as in FIG. 7A in the case where the output level is smaller than Vb (the reference level) and digital data that underwent A/D conversion as in FIG. 7B in the case where the output level is larger than or equal to Vb (the reference level) are combined. This makes it possible to perform high resolution A/D conversion on a dark area in an image in which noise is conspicuous, and to perform A/D conversion on a bright area in which noise is not conspicuous, with a low resolution but at a relatively higher speed than in the dark area. The above-described technique for speeding up A/D conversion makes it possible to improve the speed of A/D conversion of image signals without deteriorating the image quality in the image sensor, and to speed up the readout speed of the image capturing apparatus itself.

FIG. 8 is a diagram showing a pixel readout timing after an exposure time period. In FIG. 8, a synchronization signal φSP is output from TG108, a trigger signal φTRi controls a start timing of reading out image forming pixels based on the synchronization signal φSP, and a trigger signal φTRf controls a start timing of reading out focus detection pixels based on the synchronization signal φSP. After the trigger signal φTRi changes to Hi, the image forming pixels are read out while skipping the focus detection pixels during a time period Ti. After that, after the trigger signal φTRf rises to Hi, the focus detection pixels skipped during the time period Ti are read out during a time period Tf. Usually, the number of image forming pixels is larger than the number of focus detection pixels, and thus the time period Ti is longer than the time period Tf. Image signals are obtained based on pixel data read out from the image forming pixels, and picture signals for detecting a pair of image shift values are obtained from pixel data read out from the focus detection pixels.

During the time period Ti, the signals of the image forming pixels are read out while skipping the focus detection pixels, and thus the image signal do not have pixel data at addresses at which the focus detection pixels are present. In view of this, after the readout, pixel data at the addresses at which the focus detection pixels are present is interpolated by values calculated based on the signal output values of surrounding image forming pixels.

An operation of determining a reference voltage that serves as a reference for switching a range for A/D conversion of pixel signals will be described below with reference to FIGS. 9 to 11. Here, the reference voltage VREF is assumed to take Va, Vb and Vc as three different values. Va is a reference voltage for always performing A/D conversion with a high resolution, Vb is a reference voltage for output signals from image forming pixels, and Vc is a reference voltage for output signals from focus detection pixels.

The magnitude relationship between Va, Vb and Vc is assumed to be as follows.

$$Va > Vb > Vc \quad (1)$$

$$Vc = Vb \times \alpha \quad (2)$$

$$Va \geq Vsat \quad (3)$$

Note that α indicates a ratio of the sensitivity of a focus detection pixel to the sensitivity of an image forming pixel, and $0 < \alpha < 1$ holds true. Also, Vsat indicates a voltage value at a saturation signal level of a focus detection pixel.

Figure 9:
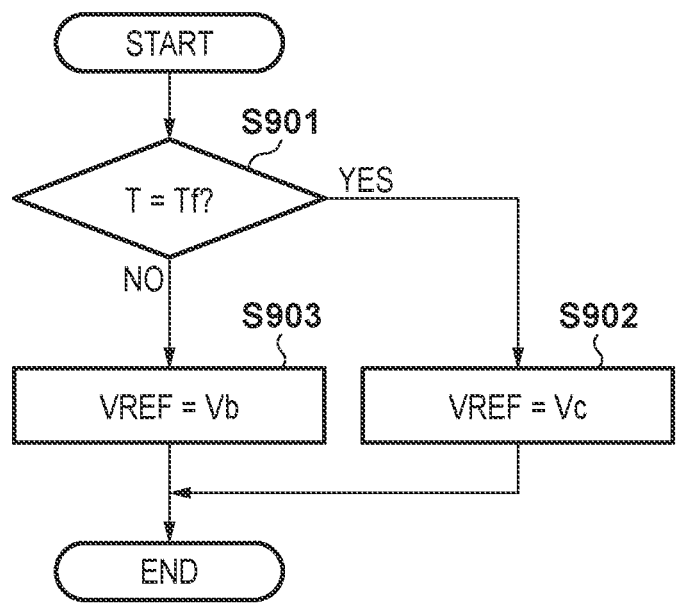
FIG. 9 is a flowchart showing a reference voltage determination procedure in the first embodiment.

FIG. 9 is a flowchart showing an operation of selecting the value of the reference voltage VREF that is different between the case of reading out focus detection pixels and the case of reading out image forming pixels.

In step S901, the reference voltage VREF is switched in synchronization with trigger signals φTRi and φTRf output from TG108 in the image sensor 606. Specifically, in the case of the time period Tf during which focus detection pixels are read out, the procedure advances to step S902, and in the case of the time period Ti during which image forming pixels are read out, the procedure advances to step S903. In step S902, the procedure ends with reference voltage VREF=Vc. In step S903, the procedure ends with reference voltage VREF=Vb.

Accordingly, the reference voltage VREF is switched between image forming pixels and focus detection pixels. This makes it possible to perform more accurate A/D conversion on focus detection pixels whose sensitivity is relatively low compared to image forming pixels, in the case where the pixel signal VSsig is lower than Vc.

Figure 10:
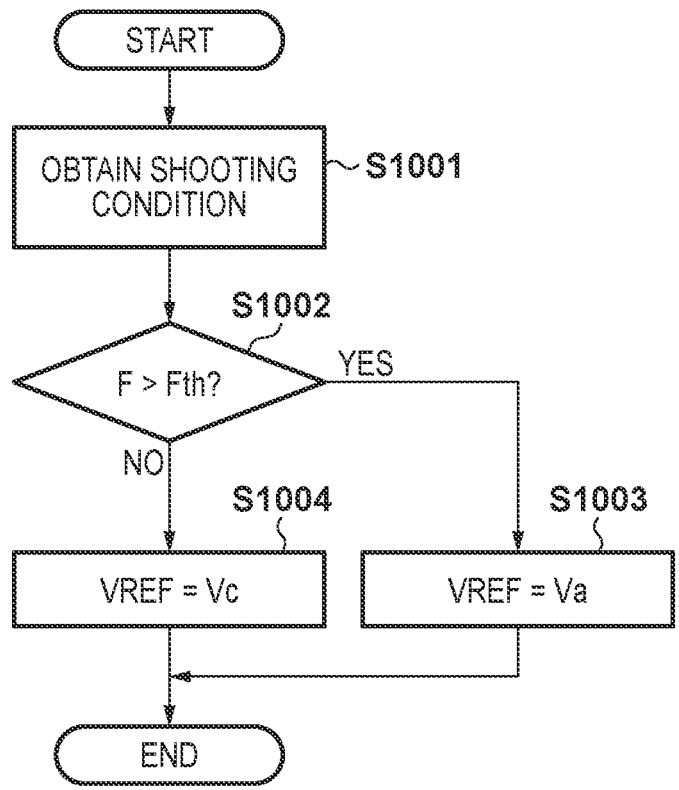
FIG. 10 is a flowchart showing a reference voltage determination procedure in the first embodiment.
Figure 11:
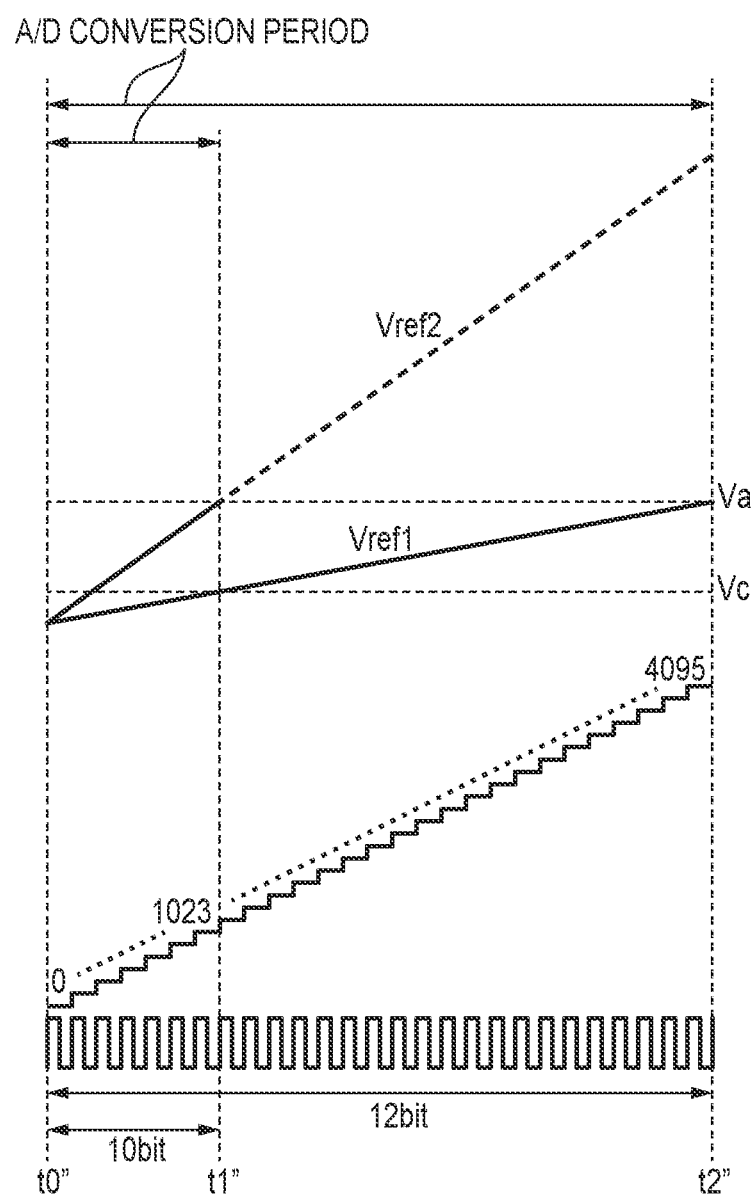
FIG. 11 is a diagram illustrating the time required for A/D conversion in the first embodiment.

FIG. 10 is a flowchart showing an operation of selecting a value of the reference voltage VREF in accordance with the f-number of the aperture that is a shooting condition in a moving image mode. In this embodiment, in the flowchart shown in FIG. 10, a reference voltage for only the focus detection pixel out of two types of pixels, namely, the image forming pixel and the focus detection pixel, is determined.

In step S1001, a shooting condition recorded in the memory unit II 614 is obtained. In step S1002, it is determined whether or not the f-number of the aperture that is a shooting condition is greater than a threshold Fth. If the f-number of the aperture is greater than the threshold Fth (the aperture is relatively narrowed), the procedure advances to step S1003, and if the f-number of the aperture is smaller than or equal to the threshold Fth (the aperture is relatively open), the procedure advances to step S1004. In step S1003, the procedure ends with reference voltage VREF=Va. In step S1004, the procedure ends with reference voltage VREF=Vc.

Specifically, in the case where the f-number of the aperture is greater than the predetermined value and the reference voltage VREF equals Va, SEL11 (111) compares Va to the output level of a pixel signal VSsig that has been read out, and outputs Low since the pixel signal VSsig is always smaller than Va. Therefore, the reference voltage when performing A/D conversion is Vref1, and A/D conversion at low speed but with a high bit accuracy can be performed. In other words, in the case where the f-number of the aperture is large and thus focus detection is difficult to perform with focus detection pixels, A/D conversion takes a long time, but highly accurate output signals can be obtained, and the difficulty in focus detection can be reduced.

On the other hand, in the case where the f-number of the aperture is smaller than or equal to the predetermined value, and the reference voltage VREF equals Vc, SEL11 (111) outputs High. Therefore, the reference voltage when performing A/D conversion is Vref2, and output signals can be obtained with a low bit accuracy but at a high speed, and focus detection can be performed at a high speed.

Here, the difference in A/D conversion accuracy and a time required for A/D conversion between the case where the reference voltage VREF equals Va and the case where the reference voltage VREF equals Vc will be described with reference to FIG. 11. In the case where the reference voltage VREF equals Vc, if the pixel signal VSsig is larger than Vc, the reference voltage Vref2 is selected, and A/D conversion is performed with 10 bit accuracy from a time t0" to t1". Also, if the pixel signal VSsig is smaller than Vc, the reference voltage Vref1 is selected, and A/D conversion is performed with 10 bit accuracy from the time t0" to t1". In the case where the reference voltage VREF equals Va, the reference voltage Vref1 is selected since the pixel signal VSsig is always smaller than Va, and A/D conversion is performed with 12 bit accuracy from the time t0" to a time t2".

As described above, an A/D conversion time in the case where the reference voltage VREF equals Va is a time that is four times longer than that in the case where the reference voltage VREF equals Vc. On the other hand, the bit accuracy of A/D conversion in the case where the reference voltage VREF equals Va is improved to four times the bit accuracy of A/D conversion in the case where the pixel signal VSsig is larger than Vc and the reference voltage VREF equals Vc.

Figure 12:
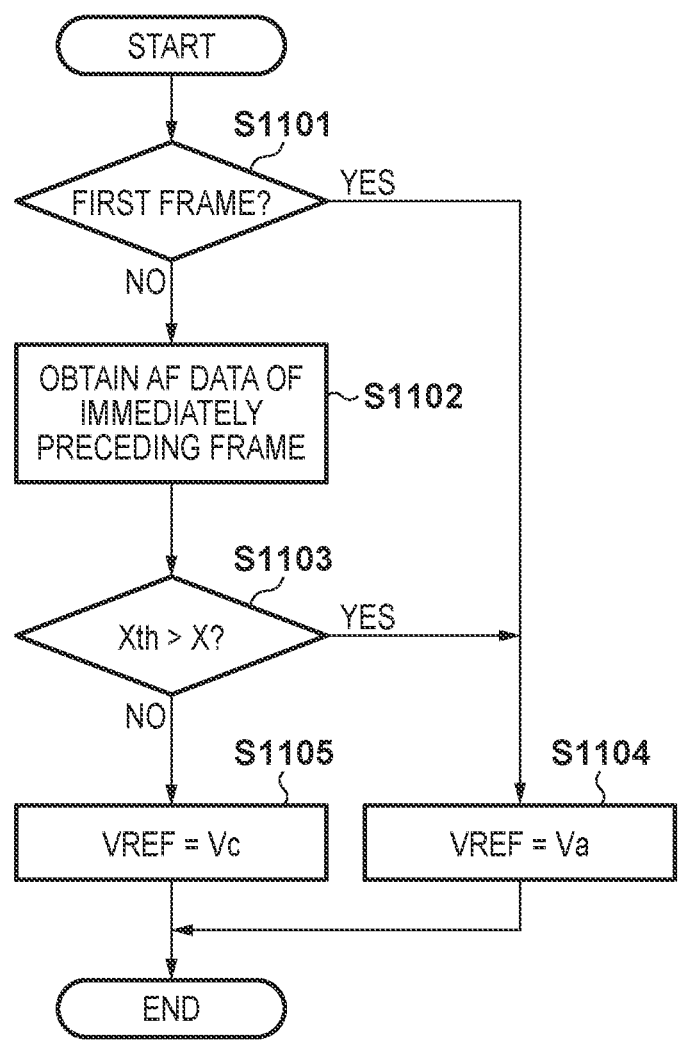
FIG. 12 is a flowchart showing a reference voltage determination procedure in the first embodiment.

In FIG. 10, the reference voltage VREF is determined in accordance with the f-number of the aperture, but the reference voltage VREF may be determined in accordance with whether or not a scene that is shot is a scene that is difficult to perform automatic focus detection on. An operation of selecting a reference voltage VREF in accordance with whether or not a scene that is shot is a scene that is difficult to perform automatic focus detection on in a moving image mode will be described with reference to FIG. 12. In this embodiment, in the flowchart shown in FIG. 12, a reference voltage for only the focus detection pixel out of two types of pixels, namely, the image forming pixel and the focus detection pixel, is be determined.

In step S1101, in the case of being the first frame, the procedure advances to step S1104, and in the case of not being the first frame, the procedure advances to step S1102. In step S1102, the defocus amount of the immediately preceding frame (previous operation) is obtained from the memory II 614. In step S1103, an obtained defocus amount X is compared to a threshold Xth. If the defocus amount X is smaller than the threshold Xth, the procedure advances to step S1104, and if the defocus amount X is greater than or equal to the threshold Xth, the procedure advances to step S1105. In step S1104, the procedure ends with reference voltage VREF=Va. In step S1105, the procedure ends with reference voltage VREF=Vc.

Specifically, in the case where the defocus amount X between the A image and the B image is small, and the reference voltage VREF equals Va, SEL11 (111) compares Va to the output level of the pixel signal VSsig that has been read out, and outputs Low since the pixel signal VSsig is always smaller than Va. Therefore, the reference voltage when performing A/D conversion is Vref1, and A/D conversion at a low speed but with a high accuracy can be performed. Accordingly, in focus detection pixels, if the defocus amount X required for focus detection calculation is not sufficiently large, A/D conversion takes a long time but highly accurate output signals can be obtained, and the difficulty in focus detection can be reduced.

On the other hand, in the case where the defocus amount X between the A image and the B image is large and the reference voltage VREF equals Vc, SEL11 (111) outputs High. Therefore, a reference voltage when performing A/D conversion will be Vref2, and output signals can be obtained with a low accuracy but at a high speed, and focus detection can be performed at a high speed.

If the output level of focus detection pixels is low output, A/D conversion can be performed with a higher resolution compared to the case where the same reference voltage is used for focus detection pixels and image forming pixels, by changing the reference voltage VREF between the image forming pixels and the focus detection pixels in this manner.

Furthermore, under a shooting condition that the f-number of the aperture is greater than a predetermined value, which deteriorates the accuracy of defocus amount detection with focus detection pixel, or when shooting a scene that is difficult to perform automatic focus detection on, deterioration in focus detection accuracy can be reduced by setting a reference voltage that gives priority to accuracy.

As described above, in this embodiment, in an image sensor that has both focus detection pixels and image forming pixels, and to which techniques for speeding up A/D conversion are applied, a timing for switching the techniques for speeding up A/D conversion is separately set for each of the focus detection pixels and the image forming pixels. This makes it possible to provide an image sensor that has an appropriate balance between SN characteristics, dynamic range characteristics, readout speed and automatic focus detection performance.

Second Embodiment

A second embodiment the present invention will be described below. This second embodiment will be described, taking an image capturing apparatus in which pixels that each have two adjacent photodiodes are arranged over the entire imaging plane of an image sensor as an example. The second embodiment of the present invention will be described below with reference to FIGS. 1, 6, 7A, 7B and 10 to 16.

The schematic configuration of the image sensor of this embodiment is similar to the configuration described with reference to FIG. 1 in the first embodiment, and thus description thereof is omitted. Note that, in this embodiment, the basic configuration and operation of the image capturing apparatus and the basic configuration and operation of the image sensor are similar to those of the first embodiment, and thus description will be given using the same figures and reference signs.

A configuration example of the pixel 101 in the image sensor in FIG. 1 will be described with reference to FIG. 13. The same reference signs are assigned to the same constituent elements as those of FIG. 1. The pixel 101 includes two photodiodes (photoelectric conversion elements) 1201r and 1201l, two transfer transistors 1202r and 1202l, a reset transistor 1203, an amplifier transistor 1204, a selection transistor 1205 and a current source 1206. The transfer transistors 1202, the reset transistor 1203, the amplifier transistor 1204, the selection transistor 1205 and the current source 1206 are similar to those described with reference to FIG. 2 in the first embodiment, and thus description thereof is omitted here.

The pixel 101 of the second embodiment has the photodiode 1201r and the photodiode 1201l, which are connected to the same floating diffusion unit FD via the transfer transistor 1202r and the transfer transistor 1202l, respectively.

The transfer transistor 1202r and the transfer transistor 1202l are respectively driven by control pulses φTRr and φTRl, and transfer electric charges accumulated in the photodiode 1201r and the photodiode 1201l to the floating diffusion unit FD. If the control pulses φTRr and φTRl are applied at the same time, the electric charges accumulated in the photodiode 1201r and the photodiode 1201l can be combined on the floating diffusion unit FD and read out.

FIGS. 14A and 14B are diagrams showing the arrangement and the configuration of pixels in the second embodiment. FIG. 14A is a plan view of pixels in 2 rows×2 columns. As is well known, in a Bayer array, G pixels are arranged in the diagonal direction, and an R pixel and a B pixel are arranged as the two remaining pixels. This structure of 2 rows×2 columns is repeatedly arranged.

FIG. 14C is an enlarged view of FIG. 14A. One unit pixel (pixel) has an on-chip microlens (ML), and is constituted to include the two photodiodes 1201r and 1201l. The photodiode 1201l arranged on the left side of the pixel is denoted by PDl, and the photodiode 1201r arranged on the right side of the pixel is denoted by PDr.

FIG. 14B is an A-A cross-sectional view of FIG. 14A. The microlens ML and the photodiodes PDl and PDr are similar to those in FIG. 14C. Also, one pixel has a color filter CF, and a wiring layer CL for forming a signal line for transmitting various signals in the CMOS sensor. The photodiodes PDl and PDr receive light that has passed through an exit pupil EPHR on the right side of the imaging optical system TL relative to the optical axis center and an exit pupil EPHL on the left side. With this configuration, pupil division is performed with the two photodiodes (PDs).

A subject image obtained with the photodiodes PDr is assumed to be an A image. Also, a subject image obtained with the photodiodes PDl is assumed to be a B image. A defocus amount of the subject images can then be calculated by calculating an image shift value from the A image and the B image. Also, in the case where it is desired to calculate a defocus amount in the vertical direction (longitudinal direction), it is sufficient that the two photodiodes PDr and PDl in one pixel are arranged side-by-side in the vertical direction.

The configuration of the image capturing apparatus in the second embodiment is similar to that described with reference to FIG. 6 in the first embodiment, and thus detailed description is omitted. However, in the second embodiment, as described with reference to FIGS. 13, 14A and 14B, the pixel configuration and arrangement of the image sensor are different. Therefore, operations of the image sensor 606 for obtaining an image signal and a pair of picture signals are different.

A pixel readout timing in the second embodiment will be described with reference to FIGS. 15A and 15B. FIG. 15A shows a readout timing in a mode (hereinafter, referred to as Mode 1) for outputting only an image signal. Also, FIG. 15B shows a timing in a mode (referred to as Mode 2) for independently outputting an image signal and one picture signal out of a pair of picture signals (a signal of at least one photodiode within a unit pixel). Here, electric charges that underwent photoelectric conversion in the two photodiodes PDr and PD1 in a pixel of the image sensor 606 are respectively denoted by electric charges Qr and Ql. Note that a synchronization signal φSP is output from TG108. A trigger signal φTRa controls a start timing of reading out the electric charge Qr of the photodiode PDr based on the synchronization signal φSP, and a trigger signal φTRb controls a start timing of reading out the electric charge Ql of the photodiode PD1 based on the synchronization signal φSP.

An operation in Mode 1 in this embodiment will be described with reference to FIG. 15A. The trigger signals φTRa and φTRb change to Hi at the same time in synchronization with the fall of the synchronization signal φSP. After the trigger signals φTRa and φTRb change to Hi at the same time, the electric charge Qr of the photodiode PDr and the electric charge Ql of the photodiode PD1 are read out during a time period Ta+b, and are combined on the FD, so as to obtain Qr+Ql. Note that accumulation times for the electric charge Qr and the electric charge Ql are respectively time periods from reset operations performed at the same time on the photodiode PDr and the photodiode PD1 until φTRa and φTRb change to Hi, before the fall of the synchronization signal φSP. In other words, the electric charge Qr and the electric charge Ql are regarded as signals obtained by being exposed for the same time period at the same time of day.

After that, the electric charges Qr+Ql are subjected to gain adjustment and A/D conversion from analog signals into digital signals, and are sent as signals Ra+b, Gra+b, Gba+b and Ba+b to the imaging signal processing circuit 607. The imaging signal processing circuit 607 performs low-pass filter processing and shading processing for reducing noise, various types of image signal processing such as WB processing, in addition, various types of correction such as defect correction, dark shading correction and black image subtraction processing, image signal compression, and the like, and generates image data. A similar operation is repeated for every fall of the synchronization signal φSP.

On the other hand, an operation in Mode 2 will be described with reference to FIG. 15B. First, the trigger signal φTRa changes to Hi in synchronization with the fall of the synchronization signal φSP. At this time, the trigger signal φTRb remains Low. After φTRa changes to Hi, the electric charges Qr of the photodiodes PDr are read out during a time period Ta. After that, the electric charges Qr are subjected to gain adjustment and A/D conversion from analog signals into digital signals, and are sent as pixel signals Ra, Gra, Gba and Ba to the imaging signal processing circuit 607. After waiting for a predetermined time period ΔT until an operation of reading out the electric charges Qr of the photodiodes PDr is complete, the trigger signal φTRb changes to Hi.

After the trigger signal φTRb changes to Hi, the electric charges Ql of the photodiodes PD1 are read out to the FD during the time period Ta+b, and are combined, on the FD, with the electric charges Qr of the photodiodes PDr that have already been read out to the FD, so as to obtain Qr+Ql. After that, the electric charges Qr+Ql are subjected to gain adjustment and A/D conversion from analog signals into digital signals, and are sent as the pixel signals Ra+b, Gra+b, Gba+b and Ba+b to the imaging signal processing circuit 607.

Exposure durations for the electric charge Qr and the electric charge Ql are respectively time periods from reset operations of the photodiodes of those electric charges until the trigger signals φTRa and φTRb change to Hi, but timings when the trigger signals φTRa and φTRb change to Hi are different. Therefore, the reset operations of the photodiodes are performed at different timings. Specifically, after waiting for the predetermined time period ΔT after the reset operation of the photodiode PDr, the reset operation of the photodiode PD1 is performed, before the fall of the synchronization signal φSP. Accordingly, the electric charge Qr and the electric charge Ql are exposed for the same time period at the same time of day. A similar operation is repeated for every fall of the synchronization signal φSP.

The imaging signal processing circuit 607 generates pixel signals Rb, Grb, Gbb and Bb originated from the electric charges Ql of the photodiodes PD1 from the pixel signals Ra+b, Gra+b, Gba+b and Ba+b and pixel signals Ra, Gra, Gba and Ba. Furthermore, an image shift value of an A image and a B image is calculated from the A image that is constituted by the pixel signals Ra, Gra, Gba and Ba and is originated from the photodiode PDr and the B image that is constituted by the pixel signals Rb, Grb, Gbb and Bb and is originated from the photodiode PD1. Furthermore, a defocus amount X is calculated from the image shift value, and is stored in the memory unit II 614. The overall control calculation unit 609 instructs the lens driving unit 602 to drive the lens unit 601, based on this defocus amount X, and a focus adjustment operation is performed. Whether to drive the image sensor 606 in Mode 1 or to drive the image sensor 606 in Mode 2 is switched in accordance with a control signal from the overall control calculation unit 609 to TG108 in the image sensor 606. A timing of an A/D conversion unit is similar to that described with reference to FIGS. 7A and 7B in the first embodiment, and thus the description thereof is omitted.

Figure 16:
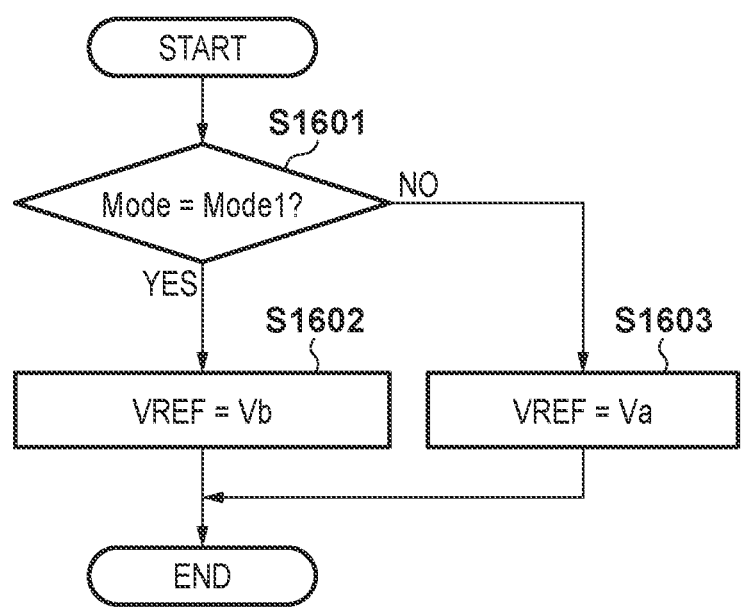
FIG. 16 is a flowchart showing a reference voltage determination procedure in the second embodiment.

FIG. 16 is a flowchart showing an operation of determining a reference voltage VREF for pixels in the second embodiment. An operation of selecting the value of the reference voltage VREF that is different between the case of driving the image sensor in Mode 1 and the case of driving the image sensor in Mode 2 will be described with reference to FIG. 16.

In step S1601, it is determined, based on a control signal from the overall control calculation unit 609 to TG108 in the image sensor 606, whether or not the driving mode of the image sensor 606 is Mode 1. If the driving mode is Mode 1, the procedure advances to step S1602, and if the driving mode is Mode 2, the procedure advances to step S1603. In step S1602, the procedure ends with reference voltage VREF=Vb. In step S1603, the procedure ends with reference voltage VREF=Va.

Specifically, in the case of a mode for reading out focus detection pixels, it is possible to obtain automatic focus detection performance that is always highly accurate by performing highly accurate A/D conversion at all times. Also, in FIG. 16, in the case of a mode for reading out focus detection pixels, highly accurate A/D conversion was always performed. However, only under a condition under which it is difficult to obtain a defocus amount when performing automatic focus detection, such as in the case where the F-number of the aperture is large or the case of a scene that is difficult to perform automatic focus detection on, highly accurate A/D conversion may be performed. An operation of determining the reference voltage VREF in accordance with the F-number of the aperture is similar to the operation shown in FIG. 10. Also, an operation of determining the reference voltage VREF in accordance with whether or not a scene that is shot is a scene that is difficult to perform automatic focus detection on is similar to that shown in FIG. 12.

In this embodiment, the case where the number of photodiodes PD in a pixel is two has been described, but it is needless to say that the same applies if the number of photodiodes PD in a pixel is four or more.

As described above, in this embodiment, a method for setting a threshold for switching a reference signal of a ramp waveform used for A/D conversion in accordance with a driving mode, a shooting condition, or a scene that is shot, in an image sensor that has a plurality of photodiodes PD in a pixel and to which a technique for speeding up A/D conversion is applied, has been described. This method makes it possible to provide an image sensor that has an appropriate balance between SN characteristics, dynamic range characteristics, readout speed, and automatic focus detection performance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-047364, filed Mar. 10, 2016, which is hereby incorporated by reference herein in its entirety.

What is claimed is:

1. An image capturing apparatus comprising:
a pixel array that has a plurality of unit pixels that each include a plurality of photoelectric conversion elements that receive light beams that have passed through different areas of an exit pupil of an imaging optical system; and
one or more circuits configured to function as:
a readout unit that reads out a pixel signal from the pixel array;
an A/D conversion unit that has a first mode for A/D converting the pixel signal read out by the readout unit with a first resolution and a second mode for A/D converting the pixel signal read out by the readout unit with a second resolution that is higher than the first resolution; and
a control unit that switches between the first mode and the second mode in accordance with a magnitude relationship between a signal level of the pixel signal read out from the pixel array and a reference level,
wherein the control unit changes the reference level between a case of combining signals of the plurality of photoelectric conversion elements in the unit pixel and reading out the combined signal and a case of independently reading out at least one signal of the plurality of photoelectrice conversion elements in the unit pixel.

2. The image capturing apparatus according to claim 1, wherein the control unit performs A/D conversion in the first mode in a case where the signal level of the pixel signal is higher than or equal to the reference level.

3. The image capturing apparatus according to claim 1, wherein the control unit changes the reference level between a case of combining signals of the plurality of photoelectric conversion elements in the unit pixel and reading out the combined signal and a case of independently reading out at least one signal of the plurality of photoelectric conversion elements in the unit pixel.

4. The image capturing apparatus according to claim 1, wherein the control unit changes the reference level depending on an f-number of an aperture of an imaging optical system.

5. The image capturing apparatus according to claim 4, wherein the control unit sets the reference level to high in a case where the f-number of the aperture of the imaging optical system is larger than a predetermined value.

6. The image capturing apparatus according to claim 1, wherein the control unit changes the reference level in accordance with a scene of a subject to be shot.

7. The image capturing apparatus according to claim 1, wherein the control unit changes the reference level based on a defocus amount.

* * * * *